Jan. 21, 1930.  O. F. BALTZLEY  1,744,026
JAR AND BOTTLE CLOSURE
Filed Oct. 11, 1926  3 Sheets-Sheet 1

Inventor
Oren F. Baltzley
By Cushman Bryant & Darby
Attorneys

Jan. 21, 1930.  O. F. BALTZLEY  1,744,026
JAR AND BOTTLE CLOSURE
Filed Oct. 11, 1926  3 Sheets-Sheet 2
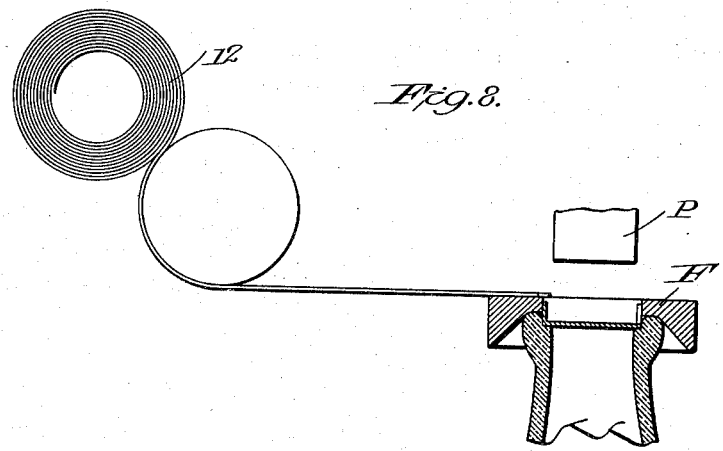
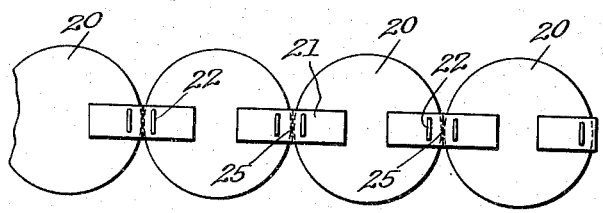
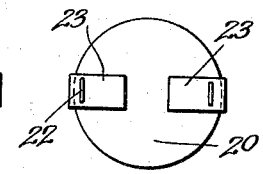
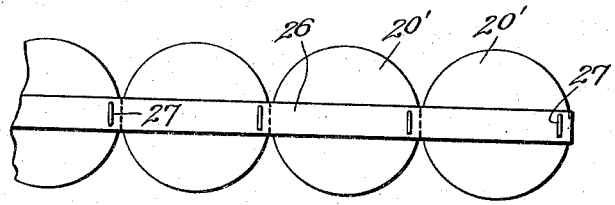
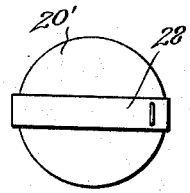
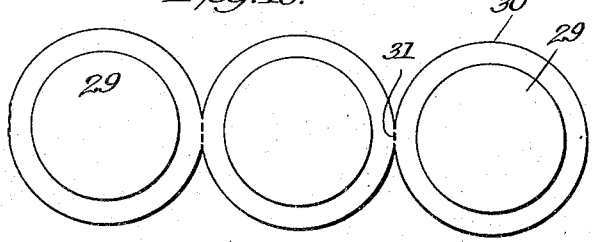
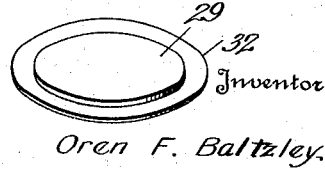
Inventor
Oren F. Baltzley.
Cushman Bryant Darby
Attorneys Jan. 21, 1930.   O. F. BALTZLEY   1,744,026
JAR AND BOTTLE CLOSURE
Filed Oct. 11, 1926   3 Sheets-Sheet 3
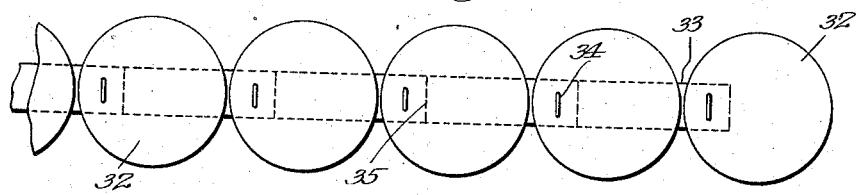
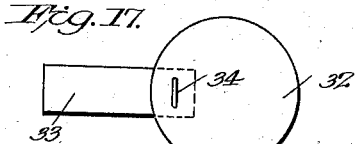
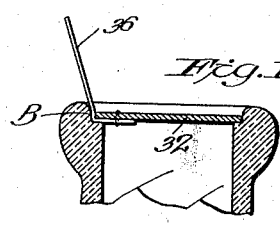
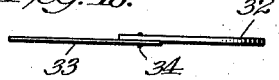
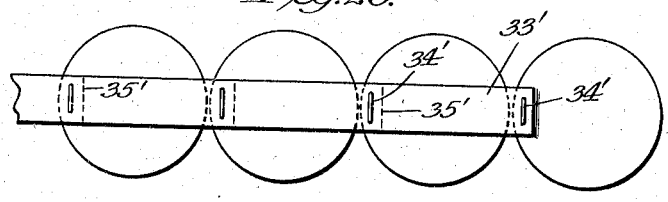
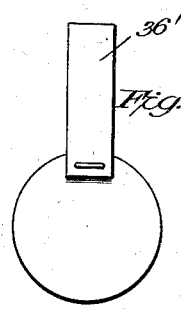
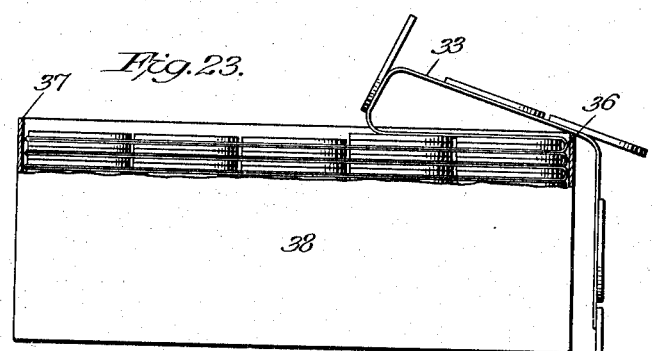
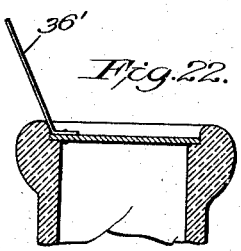
Inventor
Oren F. Baltzley
By Cushman Bryant & Darby
Attorneys Patented Jan. 21, 1930

1,744,026

UNITED STATES PATENT OFFICE

OREN F. BALTZLEY, OF HAGERSTOWN, MARYLAND

JAR AND BOTTLE CLOSURE

Application filed October 11, 1926. Serial No. 140,976.

The present invention relates to bottle closures, and more particularly to closures of the milk bottle type, which are formed of a disk of cardboard or other suitable material adapted to be sprung into the bottle mouth.

An object of the invention is to provide closures of this type in strip form, with the strips preferably wound in rolls, whereby the caps may be conveniently applied to the bottle with suitable automatic capping machinery, or by hand.

Another object of the invention is to provide a bottle cap of improved design and provided with means in the form of tabs which facilitate its application to and removal from the bottle.

Such means may also be of a character which serves to retain the caps in their strip form, although, if desired, separate means may be employed for this purpose.

Closures of the disk or milk bottle type now available, are ordinarily packed in tubes, and when the caps are applied to the bottle by automatic machinery, the tubes are arranged so that automatic feeding mechanism successively engages the lower closure in the tube, as these closures gravitate to position in the path of the feeding mechanism, and move them into a funnel-shaped mouth, beneath which the bottle is positioned. This mouth is of a sufficient size to support the closure immediately above the bottle, but permit it to be forced therethrough by a plunger. If the closure material is of short fiber, or of poor quality, a portion of the cap at its periphery will sometimes be torn or sheared off, and such portion will drop into the bottle.

Another objection to the individual and separate disk closure is that the disks tend to adhere to one another, particularly in warm weather, because of the paraffin coating with which they are provided. Attempts have been made to avoid such adherence, by penetrating the closure with the paraffin, leaving the surface with only a very thin coating. Such a closure, however, is objectionable, because the thin coating does not sufficiently protect the paper material, and in use, the cap becomes soft, subsequently losing its waterproof qualities.

The present invention has as a general object, the overcoming of the above mentioned disadvantages of the individual disk cap, which is accomplished by arranging the disks in strip form, and, preferably, in a roll. In this form their adherence to one another becomes immaterial, as the roll will unwind readily. Moreover, the roll provides a more compact body of caps for use with the capping machinery, and, hence, it is unnecessary to replenish the supply of caps as frequently as is now necessary in using the tube of individual caps.

Obviously, the invention may take various forms, and in the accompanying drawings there are shown several embodiments:—

Figure 8 is a side elevational view partially in section, showing the manner of applying a strip of caps to a bottle.

Figure 9 is an elevational view showing another strip construction.

Figure 10 is a view illustrating a single complete cap attached to the strip of Figure 9.

Figure 11 is an elevational view showing another form of strip.

Figure 12 is a view showing a single complete cap detached from the strip shown in Figure 11.

Figure 13 is an elevational view of still another strip embodying the invention.

Figure 14 is a perspective of a single complete cap detached from the strip of Figure 13.

Figure 15 is a top plan view of a modified form of cap strip construction.

Figure 16 is an edge view of the form shown in Figure 15.

Figure 17 is a top plan view of an individual cap of the type illustrated in series form in Figure 15.

Figure 18 is an edge view of the cap shown in Figure 17.

Figure 19 is a vertical sectional view showing the cap of Figure 17 in use.

Figure 20 is a top plan view of a still further modification.

Figure 21 is a top plan view showing an individual cap removed from the strip of Figure 20.

Figure 22 is a vertical sectional view showing the cap of Figure 21 in use, and

Figure 23 is an elevational view partly broken away showing an improved form of package for the caps when arranged in strip form.

Figure 1:
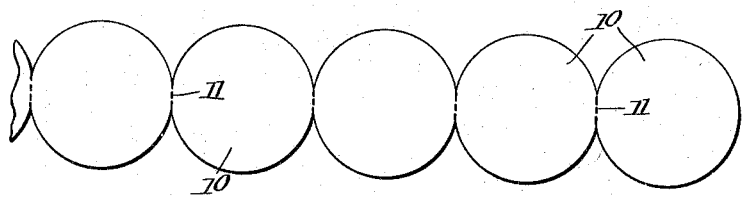
Figure 1 is an elevational view of a portion of a strip.
Figure 2:
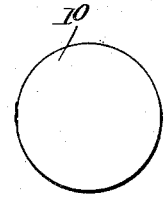
Figure 2 is a view of a cap detached from the strip of Figure 1.
Figure 5:
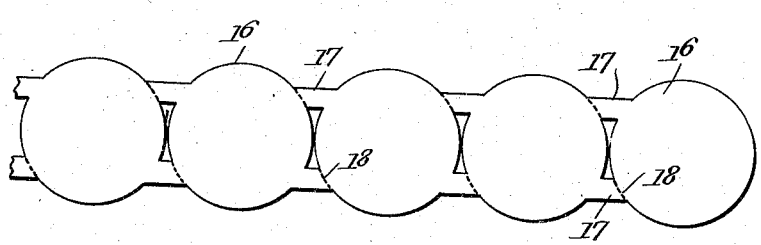
Figure 5 is a view of another form of strip.

Referring to the drawings for a more detailed description, and more particularly to Figures 1 and 2, 10 indicates a plurality of individually complete closure elements, in the present instance, of disk type, and formed from any suitable material, such as relatively heavy paper, cardboard, or even metal. The caps are formed by stamping or otherwise from sheet material, and the adjacent caps are separably united along the lines of juncture 11, which may be weakened by perforation, scoring, or any other equivalent manner, to facilitate separation of the caps as used. A strip of this character may be of any suitable length, and may be formed into a roll, such as is illustrated at 13 in Figure 8. The strip may be unwound from this roll as the caps are used and fed over the feed mouth F, which is intended to illustrate diagrammatically the conventional feed throat of a capping machine. After the individual caps are severed from the strip, they may be forced downwardly by means of plunger P, into the mouth of a milk bottle or jar M. As illustrated in Figure 8, the mechanism is shown as feeding a cap of the type as shown in Figure 5, and which will be later described, but it will be understood that the form shown in Figure 8 is intended as illustrative of the manner in which any of the cap strips may be employed.

A cap severed from the strip of Figure 1 is illustrated in Figure 2, and although this cap is shown as of the plain type, it will be understood that it, as well as the various forms hereinafter described may be provided with pull tabs, as shown, for instance, in the patent to Parker, No. 934,832, Sept. 21, 1909, or centrally arranged tabs for permitting access to the bottle without entirely removing the cap. Such constructions are common in the art, and since they constitute no part of the present invention, it is thought unnecessary to illustrate or describe further the application or the strip arrangement to a cap of this type, it being understood that the idea is applicable to any form of milk bottle cap.

Figure 3:
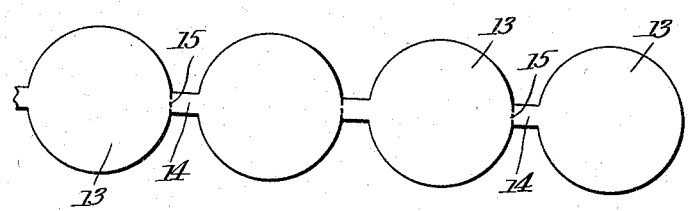
Figure 3 is a view of a portion of a modified form of strip.
Figure 4:
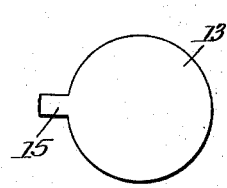
Figure 4 illustrates a complete cap detached from the strip of Figure 3.

Referring to Figures 3 and 4, there is here illustrated a strip consisting of a plurality of caps 13 connected by narrow tabs 14, which intervene between the cap bodies and space the same apart. These tabs may, if desired, be scored or otherwise weakened along lines 15 to facilitate separation of the caps from the strip. A single cap is shown in Figure 4, and, as will be observed, has extending from its margin, a pull tab 15 formed integral with the body of the cap 13.

Figure 6:
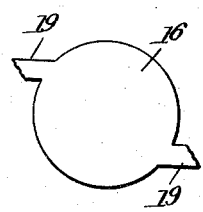
Figure 6 illustrates a single complete cap detached from the strip of Figure 5.

As will be understood, both the forms of Figures 1 and 3 may be stamped from a sheet of material having sufficient width to permit several parallel strips to be taken therefrom. This will be clearer by reference to Figures 5, 6 and 7, which illustrate still another form, in which strip of caps 16 has its adjacent caps each connected by a plurality of tabs 17. Each tab may be weakened, if desired, as by suitable scoring or perforation 18, and the caps are separated from one another in such a way that they have projecting from substantially opposite sides thereof (Figure 6) oppositely extending tab portions 19 (Figure 6). These tabs function not merely as pull elements to facilitate the removal of the cap from the bottle, but due to their disposition on opposite sides of the cap, and, preferably, laterally offset from one another, they support the cap over the feed mouth of funnel F (Figure 8) before the plunger P descends. After the cap has been severed from the strip, the tabs 19 project over the edge of the funnel and support the body of the cap spaced from the wall of the funnel. When the plunger descends, the tabs will bend upwardly very readily, and the cap may be forced without bending into the mouth of the bottle.

An advantage of a disk of this type which has the tabs projecting from each side, is that the cap throat F, through which the plunger forces the cap, may be made sufficiently large to permit the disk body to pass therethrough without close engagement with the wall of the throat. This is unnecessary, since the pull tabs will support the cap before the plunger descends for the capping stroke. With caps of the type illustrated in Figure 2, it is necessary that the throat be made slightly smaller than the disk, so that the disk will not fall through before the plunger descends. This is sometimes taken care of by providing the interior of the throat with an inwardly projecting rib. An objection to such a construction, however, is that if the disk is made of inferior or short fiber, this disk will often be torn or sheared off between the edge of the plunger and the throat, and such pieces will gravitate into the bottle. With a cap of this form, having the tabs arranged to support the cap, all necessary clearance between the periphery of the cap body and throat may be provided, and thus danger of tearing off particles of the cap is minimized.

Figure 7:
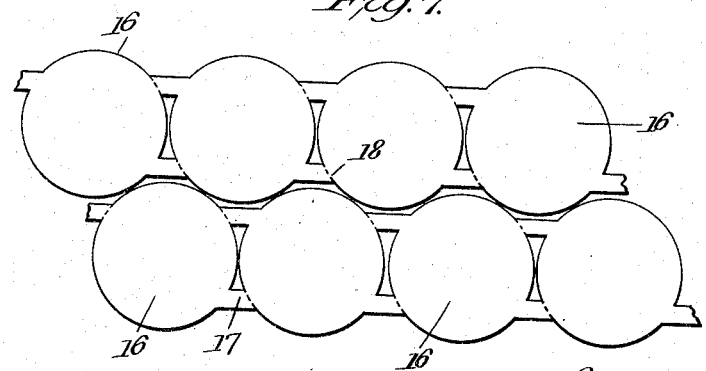
Figure 7 is an elevational view showing two strips of the type illustrated in Figure 5 after they have been cut and before separation of the strips.

Referring to Figure 7, there is illustrated the manner in which caps of these various forms may be cut from sheet material. The stock is preferably cut so that the disks are arranged with their centers on substantially 30° angles, as illustrated, and it has been found that this arrangement gives maximum production and minimum waste of stock. In Figure 7 there are shown only two strips in the relation which they have after the stamping operation, and before they have been separated. It will be understood that from a sheet of substantial width, numerous parallel strips may be cut with the disks arranged in this manner.

In Figure 9, there is shown a strip of caps 20, which are initially separated from one another, and are connected by means of a plurality of short tabs or strips 21 fastened to the individual caps, by means, such as staples 22, which pass through the securing strips 21 and the cap bodies. These staples are arranged closely adjacent the margins of the caps and the strips 21 have portions which project inwardly therefrom, carrying pull tabs 23 on each cap. The strips 21 may, if desired, be weakened by scoring or other suitable means, as indicated at 25.

The form illustrated in Figure 11 is somewhat similar to that of Figure 9, in that the caps 20' are connected by an independent strip 26, serving also to form a pull tab. However, in the present instance, the strip 26 is continuous, and substantially co-extensive with the cap strip; it extends substantially the entire width of each cap, and may be fastened to the caps by means of a staple 27. This construction provides an elongated tab 28 (Figure 12) extending entirely across the cap 20' and secured adjacent one edge of the cap.

In the form illustrated in Figures 13 and 14, the individual caps 29 are secured by adhesion or in any other suitable manner, upon a sheet 30 of relatively lighter flexible material, such as paper. The sheet 30 is formed with the portions each corresponding in outline to the cap and considerably larger than the cap. These portions may, if desired, be partially separated along their lines of juncture, as by scoring at 31, to facilitate separation of the individual closure elements, one of which is illustrated in Figure 14. This element consists of the cap 29 and a bottom larger portion 32, which, when the cap is placed in position, folds up around the edge of the cap.

Obviously, this invention may take various forms, but it will be noted that all of the closures illustrated may be readily produced in strip form, the strips being rolled, providing a complete article of manufacture for use with a capping machine. The individual closure elements of all the forms may be readily separated from the strips, and, although I have shown the caps in all the forms to be connected along weakened lines, this is not essential.

Referring to Figure 15, there is shown a preferred form of my invention in which the disk like caps 32, which are of single ply construction, are united in a series by means of a strip 33 of relatively thin, flexible material, such, for instance, as thin paper. The strip 33 is secured to one face of the caps at spaced points 34, either by moisture-proof adhesive or by staples, which are illustrated in the drawing (Figure 15). It will be noted that each point of attachment of the ribbon or strip 33 of the caps is arranged adjacent a margin of the cap, and that the ribbon 33 has a free portion, or a portion not attached to any cap portion, extending beyond the adjacent portion of the margin and over the next cap. This free portion may be scored as at 35, to facilitate severance of the caps from the series and obtain the individual cap illustrated in Figure 17. In the form illustrated, the ribbon 33 extends over the under face of each cap, and the free portion extending directly from the point of attachment and beyond the margin of the cap is of sufficient length to be folded across the edge of the cap and project upwardly between the cap edge and the bottle wall B (Figure 19) when the cap is used. The pull tab 36, provided by the ribbon 33, when disposed as illustrated in Figure 19, provides a very effective lifting means for the cap, due to the fact that the tab transmits lifting or pulling force to the extreme edge of the cap, causing it to bend and thereby relieve the diametrical pressure which retains the cap in the bottle.

The arrangement of the tab on the under face of the cap and adjacent its extreme edge permits the use of very thin flexible material which also facilitates the packing of the caps for shipment and use as will be later described. Of course, it is not necessary to secure the strip to the under face of the caps, and in Figures 20 and 21 there is shown a somewhat modified construction in which the ribbon 33' is secured at points 34' either by adhesive or staples, or both, to the top faces of the caps. The individual caps when removed from the strip relation illustrated in Figure 20, will appear as in Figure 21, and when used will have the tab 36' disposed as illustrated in Figure 22.

Although the caps of Figures 15 to 22 inclusive may be packed in roll form, as previously described, I prefer to arrange them in bulk with the strip folded back and forth in opposite directions to provide superposed layers. Referring to Figure 23, it will be observed that the strip 33 is arranged to provide at one end a plurality of folds 36 and at the opposite ends reverse folds 37. In other words, the strip of caps is folded back and forth alternatively in opposite directions to provide superposed layers in which the individual caps of adjacent layers are arranged face to face. The several layers may be packed in a carton or container 38 through the open top of which the caps may be removed by withdrawing the strip as used. It will be understood that the number of caps in each row may be varied, the determining factor being the length of the carton or package to be provided, and, of course, the number of rows in each package may be varied without departing from the invention. The caps may be removed consecutively from the package by hand for hand capping, or fed directly from the container to the capping machine.

Although the invention is described in connection with "milk bottle" caps, it will be understood that mention of this specific type of closure element is simply illustrative, and that the invention is applicable to any type of closure cap which may be provided in a continuous strip, and from sheet material, whether cardboard, paper or metal.

I claim:

1. As a new article of manufacture, an integral strip of formed and individually complete milk bottle caps having the adjacent individual caps separably united to maintain them in strip form.

2. As a new article of manufacture, an integral strip of formed and individually complete milk bottle caps having the adjacent individual caps separably united with intervening weakened lines to maintain them in strip form.

3. As a new article of manufacture, an integral strip of formed milk bottle caps having the adjacent caps separably united by a plurality of tabs.

4. As a new article of manufacture, an integral strip of formed milk bottle caps having the adjacent caps separably united by a plurality of tabs spaced apart.

5. As a new article of manufacture, an integral strip of formed milk bottle caps having the adjacent caps separably united by a plurality of narrow tabs spaced apart and intervening between the bodies of the adjacent caps.

6. As a new article of manufacture, a roll consisting of an integral strip of formed milk bottle caps having the adjacent caps separably united by a plurality of narrow tabs, said tabs having weakened lines.

In testimony whereof I have hereunto set my hand.

OREN F. BALTZLEY.